United States Patent [19]
Ko et al.

[11] Patent Number: 6,051,298
[45] Date of Patent: Apr. 18, 2000

[54] OPTICAL DISC HAVING PROTECTIVE FILMS

[75] Inventors: Jung-Wan Ko; In-Sik Park, both of Suwon, Rep. of Korea

[73] Assignee: Samsung Electronics Co., Limited, Suwon, Rep. of Korea

[21] Appl. No.: 08/835,744

[22] Filed: Apr. 10, 1997

[30] Foreign Application Priority Data

Jan. 22, 1997 [KR] Rep. of Korea .................. 97-1758

[51] Int. Cl.$^7$ ........................................ B32B 3/00
[52] U.S. Cl. ................... 428/64.1; 428/64.4; 428/64.6; 428/688; 428/696; 428/698; 428/913; 369/283; 369/288
[58] Field of Search ........................... 428/64.1, 64.2, 428/64.4, 64.6, 688, 696, 698, 699, 913; 369/283, 288

[56] References Cited

U.S. PATENT DOCUMENTS

| | | | |
|---|---|---|---|
| 5,008,128 | 4/1991 | Kudo et al. | 427/130 |
| 5,061,562 | 10/1991 | Yamanaka et al. | 428/408 |
| 5,154,957 | 10/1992 | Yamada et al. | 428/64.1 |
| 5,232,737 | 8/1993 | Ueno et al. | 428/64 |
| 5,292,568 | 3/1994 | Tezuka et al. | 428/64 |
| 5,618,617 | 4/1997 | Uchida et al. | 428/323 |

*Primary Examiner*—Elizabeth Evans
*Attorney, Agent, or Firm*—Staas & Halsey

[57] ABSTRACT

A high density optical disc having an optical disc protective structure for enabling a high density information recording and retrieval optical disc. The optical disc includes: a first protective film coated by a few tens of microns, on the reading surface of the optical disc, the first protective film having good transmissivity and high hardness against abrasion; and a second protective film coated by a few microns and having a lower surface energy and a minute molecular structure, providing protection against fingerprints on the surface of the first protective film.

33 Claims, 5 Drawing Sheets

OPTICAL DISC HAVING PROTECTIVE FILMS

BACKGROUND OF THE INVENTION

RELATED APPLICATION

The present application is based on Korean Application No. 1758/1997 which is incorporated herein by reference for all purposes.

1. Field of the Invention

The present invention relates to an optical disc and, more specifically, to an optical disc having protective films which enable a high density optical disc for information recording and retrieval.

2. Description of the Related Art

A compact disc (hereinafter, referred to as a CD) and a digital video disc (hereinafter, referred to as a DVD) are representative exemplars of an optical disc, which is a conventional optical recording medium. FIG. 1 depicts the structure of a conventional CD, and FIGS. 2A and 2B depict the structure of a conventional DVD. More specifically, FIG. 2A illustrates the structure of a DVD for a double-sided recording system, and FIG. 2B illustrates the structure of a DVD for a double-layer recording system. The thickness of the CD and DVDs depicted in FIGS. 1, 2A and 2B is approximately 1.2 mm.

The optical disc shown in FIG. 1 comprises a disc substrate 10 carved with pits (made in an uneven form), a reflection film 12 formed in the pits of the disc substrate 10, and a protective film 14 formed on the reflection film 12.

More specifically, FIG. 1 is a sectional diagram of a CD which includes a reflection film 12 of about 0.05 μm in thickness formed in the pits of the disc substrate 10, which is about 1.2 mm thick. A protective film 14, with a thickness of about 10 μm, is deposited on the reflecting film 12.

FIG. 2A is a sectional diagram of a DVD for a double-sided recording system and includes reflection films 24 and 26 which are respectively shaped into disc substrates 20 and 22, each having a thickness of about 0.6 mm. Protective films 28 and 30 are provided on the reflection films 24 and 26 respectively, and an adhesion layer 32 for adhering the above disc substrates 20 and 22 to each other is provided between the protective films 28 and 30. FIG. 2B is a sectional diagram of a double-layer DVD recording system and includes a first reflection film 42 having a thickness of about 0.05 μm shaped in the pit of the disc substrate 40, which has a thickness of about 1.2 mm. A substrate layer 44 having a thickness of approximately 40 μm is formed in the pits of the first reflection film 42. A second reflection film 46, having a thickness of about 0.05 μm, is formed in the pits of the substrate layer 44. A protective film 48, having a thickness of approximately 10 μm, is deposited on the second reflection film 46. In the prior art, the first reflection film 42 is made of a dielectric semitransparent film.

The elements comprising the optical disc illustrated in FIG. 1 and FIGS. 2A and 2B, namely, the disc substrate, the reflection film, and the protective film are made using the following processes and constructed from the following materials. The disc substrate carved with pits is made using processes such as compression, injection, 2 P photo polymerization and so on, and the substrate is made from polycarbonate plastics. The reflection film disposed in the pits of the disc substrate is made through processes such as vacuum evaporation and sputtering and made of aluminum. A protective film is coated on the aluminum reflection film to protect this thin aluminum film from damage which may arise from general physical contact and from oxidation of the reflection film. The spinning process is mainly used to apply this protective film coating, which is generally comprised of a resin material.

An optical disc made using the conventional process above can be contaminated by the adhesion of dust or fingerprints which may be deposited on the optical disc reading surface during use. A minor amount of dust or fingerprints adhering to the reading surface of a conventional optical disc may not produce errors during usage. However, more substantial amounts of dust or fingerprints will produce errors arising from the difficulty of transmitting the energy of a laser beam through the dust and fingerprints to the pits formed in the disc substrate. Moreover, in the case of a high density optical disc, even minor amounts of dust or fingerprints can lead to the same difficulty. The adhesion of fingerprints on the reading surface of an optical disc is an especially well-known problem which can even result in the misreading of information recorded on the disc. Consequently, users are advised to take precautions to avoid permitting dust or fingerprints to adhere to the disc substrate and to remove such substances when they are found on the disc.

Nevertheless, scratches may be generated on the reading surface of an optical disc in the process of removing dust or fingerprints from the reading surface of the optical disc, such that as shown in FIGS. 1, 2A and 2B. In particular, if a fingerprint adheres to the optical disc, the user should certainly clean the surface of the optical disc to remove the fingerprint. Unfortunately, severe scratching may result on the reading surface of the optical disc due to friction caused by the cleansing action. In addition, scratches may easily arise on the reading surface of the optical disc shown in FIGS. 1, 2A and 2B through a user's negligence.

With reference to the optical disc illustrated in FIGS. 1, 2A and 2B, reference numeral 16 (16-1 and 16-2 in FIG. 2A) denotes the reading surface of an optical disc which is made from polycarbonate plastics, as are disc substrates 10, 20, 22 and 40. Polycarbonate plastics offer little protection from scratching.

A cartridge may be used as an external protective device for stably protecting a conventional optical disc, such as that shown in FIGS. 1, 2A, and 2B, against scratching caused during the removal of dust or fingerprints. Unfortunately, the use of a cartridge as an external protective device gives rise to a considerable increase in the manufacturing cost of the optical disc. When the cartridge, serving as the external protection device, is inserted or separated from the disc, the disc can still be seriously exposed to exterior damage. Moreover, there occurs a problem in that scratches may arise on the optical disc due to the external impact caused by simply positioning the optical disc in the cartridge. In summary, the use of a cartridge does not completely protect an optical disc from dust, fingerprints, or scratching.

With optical disc storage capacities rising to higher and higher densities, a solution to the problems above becomes increasingly urgent, especially since high reading data loss per unit area still persists due to dust or fingerprints adhering to the reading surface of the optical disc and scratches made on the reading surface thereof. In other words, while the size of the pits, as a reading unit of the optical disc, steadily decreases to increase the recording capacity of the optical disc, the contamination capable of being generated on the reading surface of the optical disc by various environmental factors, such as dust, fingerprints, and scratches, has not been appreciably reduced. Accordingly, as the recording density of optical disc increases, the negative effects of fingerprints and scratches relatively increase as well.

Error correcting codes can somewhat compensate for the above problems and enable optical disc to be recorded at high density. In fact, the necessity of using error correcting codes to perform error corrections arising from scratches, dust, and fingerprints in high-density pits comparatively increases with higher and higher density. However, in light of other controls, such as the servo, when the width of the recorded track is diminished accordingly, these controls are not increased in proportion to the decrease of the width of the track, which results in deviation from the track.

In other words, if there is an interval where a signal is not detected because of scratches, dust, or fingerprints, which can often arise during ordinary usage, the signal as a controlling object is reduced in proportion to the increase of the recording density in spite of having equal conduction. As a result, it is necessary to heighten the precision of the counterpart servo. In summary, in all applications of optical disc recording and retrieval apparatuses, as the recording density becomes higher and higher, the limitations of error correcting codes to perfectly remove the effects of scratches and fingerprints becomes more pronounced.

SUMMARY OF THE INVENTION

It is an object of the present invention to provide a high density optical disc having an optical disc protective structure which enables high density recording and reproduction of the information stored on the optical disc, thereby overcoming the foregoing problems.

It is an another object of the present invention to provide an optical disc for protecting data in the optical disc while lowering the manufacturing cost of the optical disc.

It is a yet another object of the present invention to provide an optical disc having a high tolerance against scratches, dust, and fingerprints on the optical disc reading surface.

It is a further object of the present invention to provide an optical disc having a structure capable of performing an anti-static function on the optical disc.

In order to achieve these and other objects, the present invention provides an optical disc, comprising: a first protective film coating of a few tens of microns, on the reading surface of the optical disc. The first protective film has good transmissivity and high hardness against damage. A second protective film coating of a few microns is also applied which has a lower surface energy and a minute molecular structure to provide protection from fingerprints on the surface of the first protective film.

BRIEF DESCRIPTION OF THE DRAWINGS

A more complete appreciation of this invention, and many of its attendant advantages, will be readily apparent as the invention becomes better understood with reference to the following detailed description when considered in conjunction with the accompanying drawings, in which like reference symbols indicate the same or similar components, wherein.

DETAILED DESCRIPTION OF THE PREFERRED EMBODIMENTS

In the following description, numerous specific details are set forth to provide a more thorough understanding of the present invention. It will be apparent, however, to one skilled in the art that the present invention may be practiced without these specific details. The detailed description of known functions and structures which might unnecessarily obscure the subject matter of the present invention will be avoided.

Figure 3:
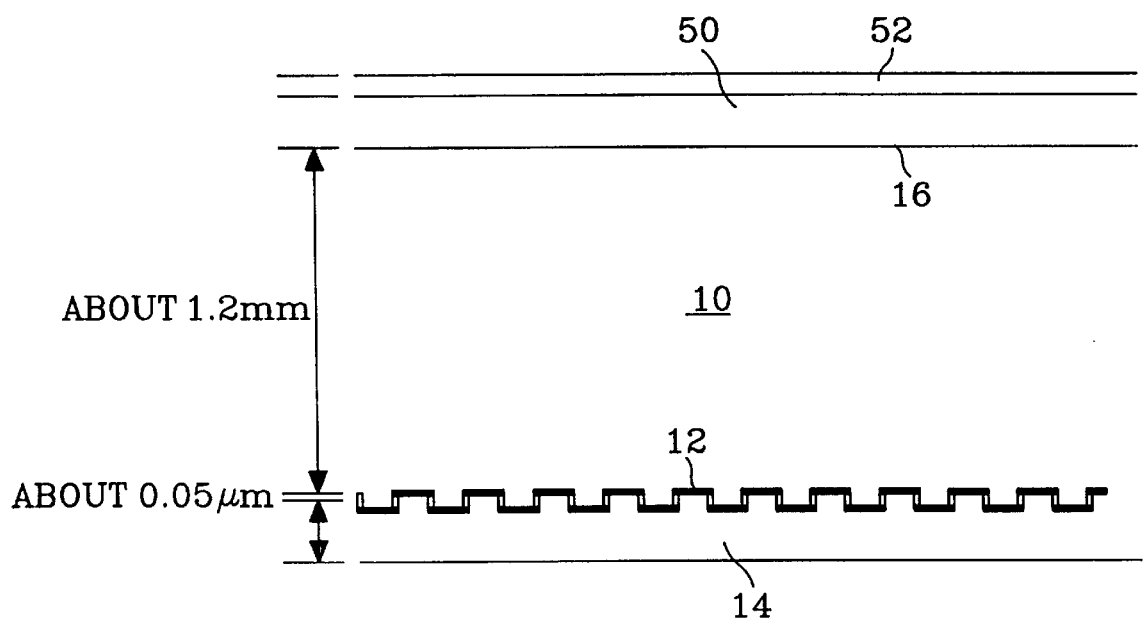
FIG. 3 is a diagram showing the structure of a compact disc according to an embodiment of the present invention.
Figure 4A:
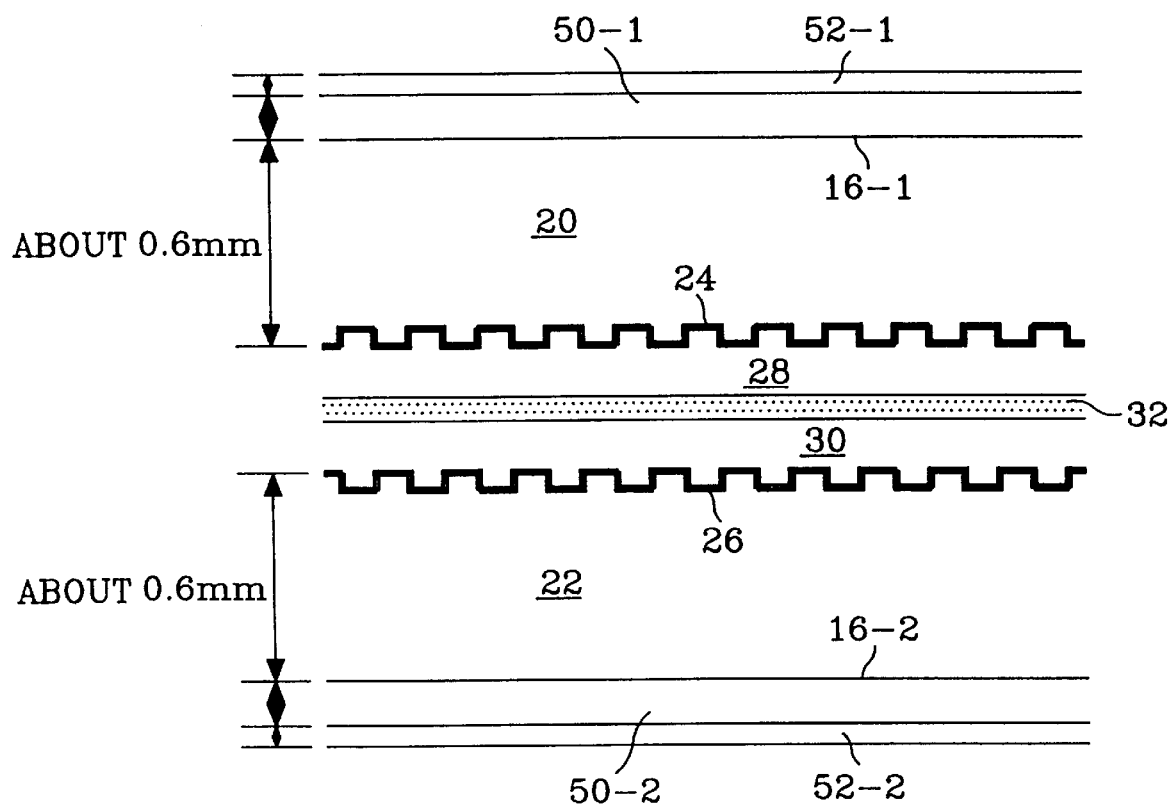
FIGS. 4A and 4B are diagrams showing the structure of a digital video disc according to further embodiments of the present invention.
Figure 4B:
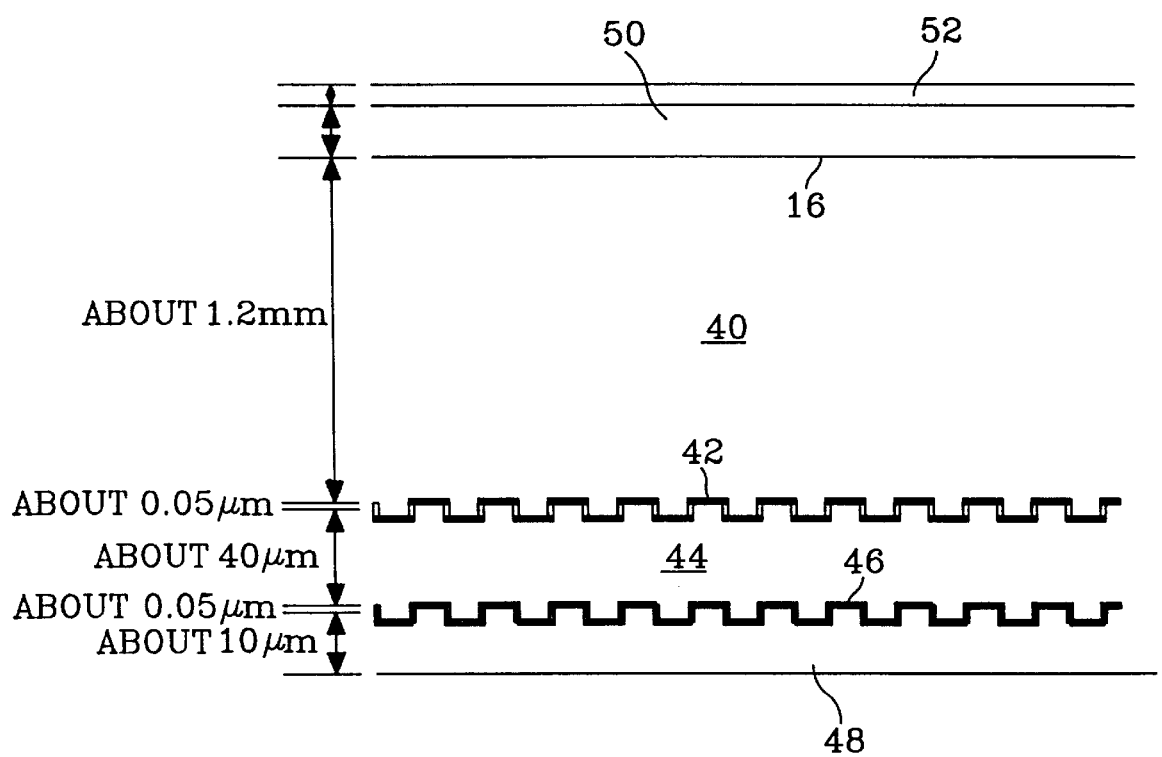

FIG. 3 is a diagram showing the structure of a CD according to an embodiment of the present invention. FIGS. 4A and 4B are diagrams showing the structure of a DVD according to further embodiments of the present invention.

Figure 1:
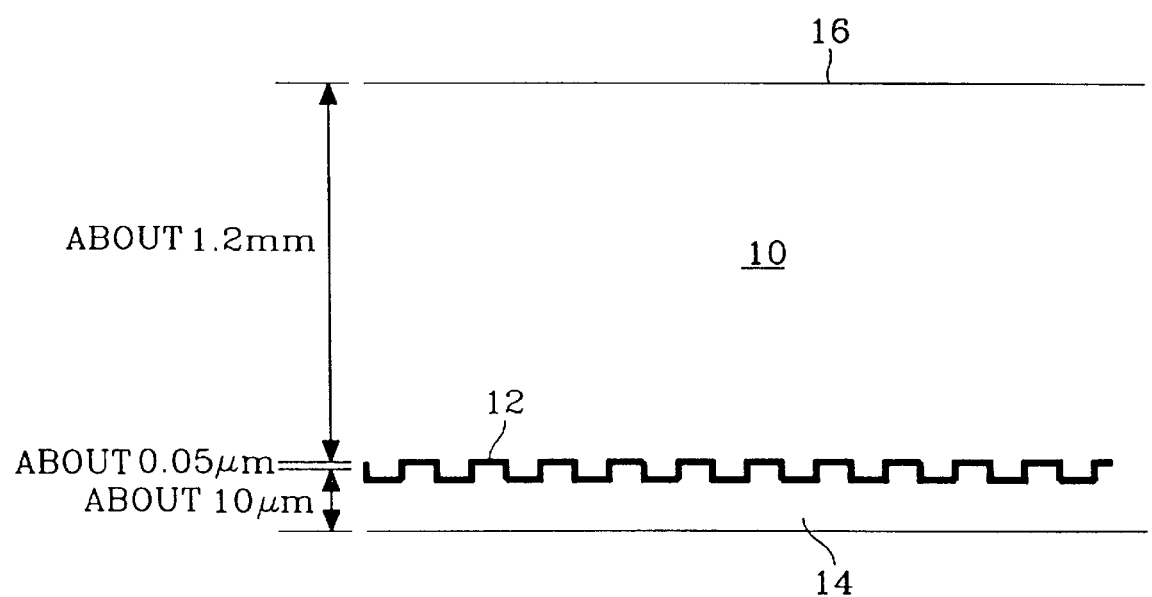
FIG. 1 is a diagram showing the structure of a conventional compact disc.

Observing the structure of one embodiment of a CD of the present invention, shown for example in FIG. 3, it can be readily seen that a first protective film 50 and a second protective film 52 are additionally formed on the structure of the prior art CD shown in FIG. 1. Here, the first protective film 50 is formed on the reading surface of the optical disc to provide protection from damage, and the second protective film 52 is formed on the first protective film 50 to provide protection from fingerprints and dust.

Figure 2A:
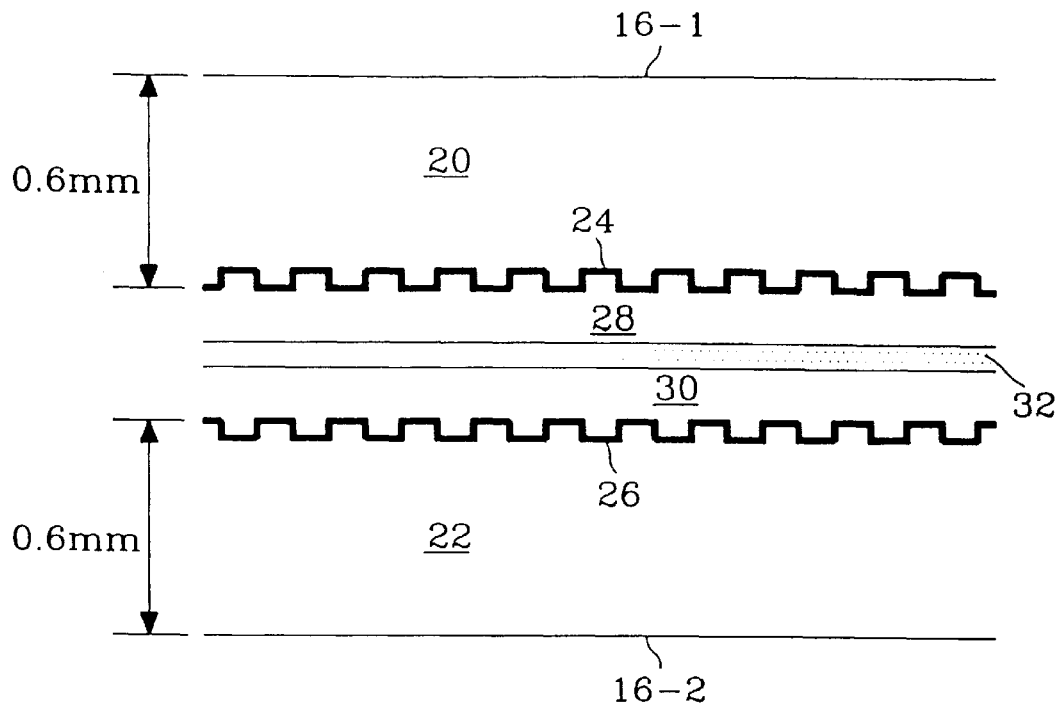
FIGS. 2A and 2B are diagrams showing the structure of a conventional digital video disc.

Observing the structure of a DVD for a double-sided recording system, according to another embodiment of the present invention, shown for example in FIG. 4A, it can be seen that each of first protective films 50-1 and 50-2 and second protective films 52-1 and 52-2 are additionally formed on reading surfaces 16-1 and 16-2 using the structure of the prior art DVD shown in FIG. 2A. The first protective films 50-1 and 50-2 have the same function as the first protective film 50, and the second protective films 52-1 and 52-2 have the same function as the second protective film 52.

Figure 2B:
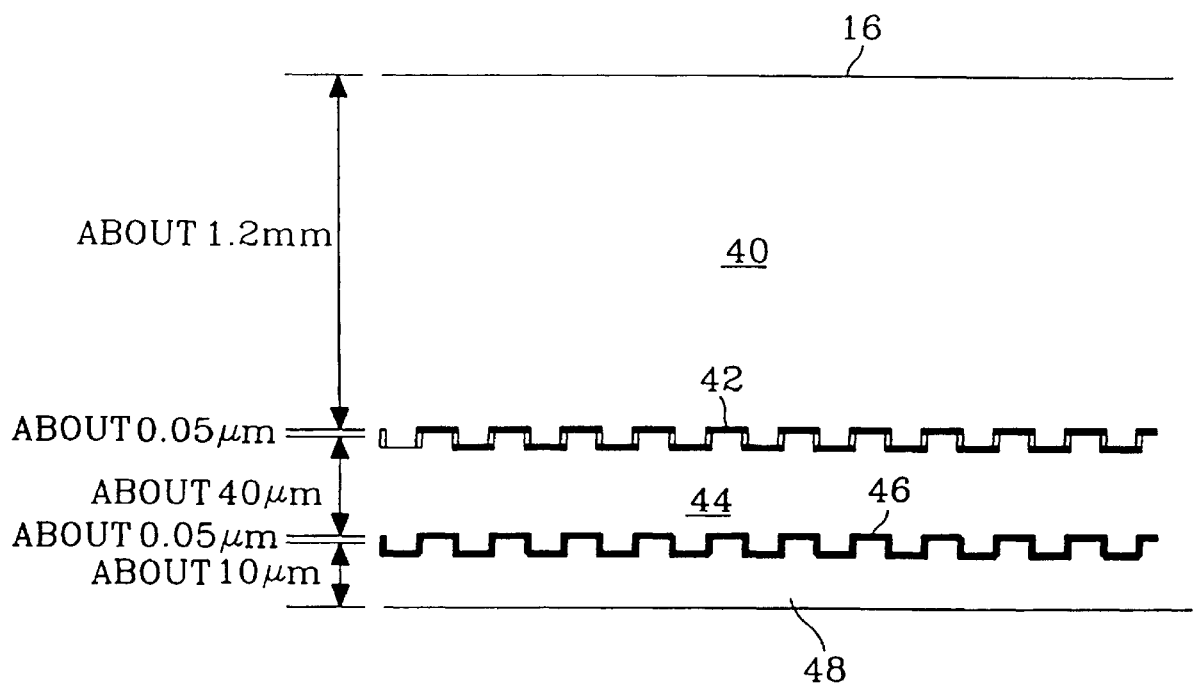

Furthermore, observing the structure of the two-layer DVD recording system, according to another embodiment of the present invention, shown for example in FIG. 4B, it can be seen that the first protective film 50 and the second protective film 52 are additionally formed to the reading surface 16 of the structure of the two-layer DVD shown in FIG. 2B.

The first protective films 50, 50-1 and 50-2 are made from a material having good light transmissivity and high hardness on reading surfaces 16, 16-1 and 16-2 of the optical disc illustrated in FIGS. 3, 4A, and 4B such as diamond coating, DLC (diamond like carbon) coating, $SiO_2$ (such as silica) material coating and a carbonate coating, and the fluormagnesium material coating process. An optical disc having the first protective films 50, 50-1 and 50-2 features high resistance to external stress, which may be varied by the membrane effect, and protection of the polycarbonates in the disc substrate material against damage caused by dust and fingerprints.

If the first protective films 50, 50-1 and 50-2 are formed using the diamond coating, then manufacture of the optical disc has the disadvantages of taking too much time and requiring a high temperature for the coating process while offering the advantages of providing good transmissivity and high hardness. It is generally preferable to perform the diamond coating through use of vacuum evaporation in order to shape the first protective films 50, 50-1 and 50-2.

In contrast, coating the first protective films 50, 50-1 and 50-2 with the DLC coating, results in slightly lower transmissivity than optical disc produced by the diamond coating. However, since this technique maintains sufficient transmissivity for thin films, the DLC coating is desirable. Forming the above films using the DLC coating is sufficiently practical because the temperature range for coating is 50°~150° Celsius. In addition, if the time needed for coating depends on the thickness of the film above, the time can be adjusted to extend from a few seconds to a few tens of seconds.

On the other hand, when coating the first protective films 50, 50-1 and 50-2 with the $SiO_2$ coating, the optical disc has the disadvantage of providing lower hardness than that of the diamond coating or the DLC coating while having the advantage of performing the above technique without requiring the use of additional equipment. That is, when evaporating the optical disc by using a combination with $SiO_2$ (silica) instead of aluminum as the target of the vacuum depositing equipment, the first protective films 50, 50-1 and 50-2 are formed accordingly. The $SiO_2$ coating can also be performed through vacuum evaporation.

In FIGS. 3, 4A and 4B, the second protective films 52, 52-1 and 52-2 are shaped on the respective first protective films 50, 50-1 and 50-2 formed on the reading surfaces 16, 16-1 and 16-2 of the optical disc respectively. The second protective films 52, 52-1 and 52-2 are made by a fluor (F) coating. For example, this process could be used to coat a material having a low surface energy and a minute molecular structure for protection against fingerprints or dust. The thickness of the second protective films 52, 52-1 and 52-2 is preferably only a few microns ($\mu$m), and the second protective films are preferably made by spinning. Fluor film has the feature of having a minute molecular structure and low surface energy. Because of these characteristics, the fluor film repels water and oil molecules. In other words, since the surface tension of either water or oil is greater than the surface energy of the fluor film, both water and oil will not adhere to the fluor film and simply roll off.

Thus, fingerprint, dust, and oil damage can be easily reduced by the fluor film. This film operates along the same lines as food not readily sticking to kitchen instruments coated with teflon, which is a fluor-type material. This ability arises from the physical features of the fluor material. While a fluor material has a high binding force between the atoms thereof, the attraction force between molecules of a fluor material is very low. As a result, the film has the features of low surface energy, low contact strength, and high stream stress.

Fluorad FC-722 manufactured and sold by the 3M Corporation (Minnesota Mining & Manufacturing Co.) of the United States is a product providing a water and oil repellant for an object by coating it with a fluor-rich polymer. In other words, the object will correspond to a product where the fluor high polymer has been melted in a fluor material which is colorlessness and odor-free by 2.0% (this percentage corresponds to the fluor high polymer). Because Fluorad has a boiling point of 56° C., low surface tension, low contact strength, and good volatility, it has a very good coating effect on glass, steel, aluminum, copper, and plastic. While Fluorad has an index of refraction of 1.36, in contrast with polycarbonate plastics, which have an index of refraction of 1.58, and high transparency, Fluorad provides little optical occlusion for thicknesses from a few microns to a few tens of microns, especially in relation to the thickness of the overall disc substrate.

The surface energy of teflon and polyethylene are respectively 18 and 31 dyne/cm, while that of the fluor-rich polymer included in the FC-722 is very low, about 11–12 dyne/cm. Thus, if a material such as haptene, toluene, acetone or water reaches the surface of an FC-722 coated material, the material is repelled due to the low surface energy. In addition, FC-722 can retain its characteristic features without change up to 175° C.

A fluor-magnesium combination is well-known as a protective film for protecting the surface of a polycarbonate plastic and has a minute surface structure. That is, a fluorine resin or fluor combination provides effective protection against contamination arising from water or oil molecules because of the low surface energy provided by teflon, for example, as a representative fluor material. "Fluor" as set forth in this application means "fluorine (F)," a fluorine-magnesium combination contains "$MgF_2$" and a fluorine combine (compound) contains "flourine." In addition, the minute structure of the surface by the binding force of the forcible atom has a high hardness from the combination with magnesium, thereby providing protection against scratches on an exterior surface. In short, this coating can protect the surface of an optical disc against contamination by water or oil and against fingerprints with high hardness.

In another embodiment of the present invention, when using the fluor combination, the first protective film and the second protective film may be combined in a unitary protective film. Here, because the unitary protective film coated with the fluor combination has high hardness, low surface energy as well as a minute surface structure by the atom binding force, it provides protection against scratches, dust, and fingerprints, simultaneously.

As depicted in FIGS. 3, 4A and 4B, the present invention includes the first protective films 50, 50-1, and 50-2 coated with a material having good light transmissivity and high hardness with a thickness of only a few tens of microns on the reading surfaces 16, 16-1 and 16-2. In other words, the surface of the optical disc for reading recorded information, and the second protective films 52, 52-1 and 52-2 coated with a thickness of a few microns in a minute molecular structure on the first protective films 50, 50-1 and 50-2, thereby prevents the optical disc from being damaged due to friction caused by dust, scratching due to stresses applied to the dust, fingerprints, or oil.

Additionally, these embodiments of the present invention also provide anti-static protection on the surface of a conventional optical disc by coating the reading surface of the optical disc.

Since a laser beam for reading information recorded on the surface of the optical disc is refracted by a small angle in the first protective film, and the second protective film because of the coating of the first protective film, refraction should be taken into account in all embodiments of the present invention. For example, it is desirable to make the thickness of the first protective film and the second protective film very thin or to adjust the angle of incidence after consideration of the refraction of the first protective film and the second protective film.

One may expect the following problems to arise because of the difference in refraction between the two layers of the first protective film and the second protective film. First, due to the above differences, light may not be incident therebetween for appropriate radiation. In addition, the focal distance focusing at the pits of the reflection film for recording information on the disc may be changed. However, the laser beam irradiated on the disc is almost always irradiated on a perpendicular angle, which may produce a problem such as total reflection on the surface due to differences between two protective films. In short, the above problems cannot be ignored. Nevertheless, in the example of a thin DVD having a thickness of only 0.6 mm, the thickness of the coating film is only a few tens of microns, so that the focal distance for adjusting the focus, in fact, changes by only a few microns itself. In contrast, the range of the focus driving equipment for adjusting the focus is a few mm, and thus the refraction of the incidence light can be ignored.

Furthermore, in the second protective film, fluorine can be easily melted in the fluorine solvent. Accordingly, upon installing the second protective film for preventing contamination by water, oil, and fingerprints, on the first protective film, there is a possibility of generating scratches in the second protective film. Deep scratches can be prevented by the first protective film beneath the second protective film which is a thin film, and thus information (pits) on the disc can be protected from the deep scratches. Fine scratches on the second protective film can be restored by using the surface cleaner included with the fluorine solvent if scratches do arise. In this instance, if the first protective film is coated using the diamond coating, the DLC coating the $SiO_2$ material coating or the carbonate coating, then protection will be provided against the chemistry of the solvent. Thus, the present invention enhances the ability to use a solvent.

As is apparent from the foregoing discussion, the present invention includes a first protective film coated with a material having a good light transmissivity and a high hardness with a thickness of a few tens of microns on the reading surface of the optical disc, and a second protective film coated with a thickness of a few microns in a minute molecular structure on the first protective films. These layers thereby prevent damage to the optical disc from friction, caused by dust, and scratches and stress caused by dust, fingerprints, or oil. As a consequence, heightened data protection can be provided. Likewise, the first protective film and the second protective film can be constructed with one unitary protective film using an appropriate ratio of the fluor-magnesium combination and fluorine. While this embodiment offers less protection than using separate protective films, it has the advantage of reduced manufacturing costs.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. An optical disc, comprising:
   a reading surface;
   a first protective film formed on the reading surface of the optical disc, said first protective film having good transmissivity and high hardness; and
   a second protective film having a low surface energy to provide protection against fingerprints or dust formed on a surface of said first protective film.

2. The disc as recited in claim 1, wherein said first protective film is formed using an $SiO_2$ coating.

3. The disc recited in claim 2, wherein said fluormagnesium coating is performed by sputtering.

4. The disc recited in claim 2, wherein said fluormagnesium coating is performed by spinning.

5. The disc as recited in claim 1, wherein said second protective film has a minute molecular structure.

6. The disc recited in claim 5, wherein said second protective film is formed using a fluor coating.

7. The disc recited in claim 1, wherein said second protective film is formed using a fluor material coating.

8. An optical disc, comprising:
   a reading surface; and
   a first protective film formed using a diamond coating on the reading surface of the optical disc, said first protective film having good transmissivity and high hardness.

9. The disc recited in claim 8, wherein said diamond coating is performed by vacuum evaporation.

10. An optical disc, comprising:
    a reading surface; and
    a first protective film formed using a diamond like carbon (DLC) coating on the reading surface of the optical disc, said first protective film having good transmissivity and high hardness.

11. The disc recited in claim 10, wherein said DLC coating is performed by vacuum evaporation.

12. An optical disc, comprising:
    a reading surface; and
    a first protective film formed using an $SiO_2$ coating on the reading surface of the optical disc, said first protective film having good transmissivity and high hardness.

13. The disc recited in claim 12, wherein said $SiO_2$ (silica) coating is performed by vacuum evaporation.

14. An optical disc having a reading surface, comprising:
    a first protective film coated on the reading surface of the optical disc, said first protective film having good transmissivity and high hardness against damage; and
    a second protective film having a low surface energy and a minute molecular structure to provide protection from fingerprints on a surface of said first protective film.

15. The disc as recited in claim 14, wherein said first protective film is formed using a diamond coating.

16. The disc as recited in claim 14, wherein said first protective film is formed using a diamond like carbon (DLC) coating.

17. The disc as recited in claim 14, wherein said first protective film is formed using an $SiO_2$ coating.

18. The disc as recited in claim 14, wherein said first protective film is formed using a fluor-magnesium coating.

19. The disc recited in claim 14, wherein said second protective film is formed using a fluor material coating.

20. An optical disc, comprising:
    a protective film containing fluor having good transmissivity, high hardness, low surface energy, and minute molecular structure to provide protection from fingerprints, abrasions, and scratches on a recording surface of said optical disc.

21. The disc recited in claim 20, wherein said material containing fluor is a polycarbonate.

22. An optical disc, comprising:
    a reading surface; and
    a protective film, coated with a fluor combination having low surface energy, to protect the reading surface of the optical disc from water, oil, and fingerprints.

23. The disc recited in claim 22, wherein the reading surface of the optical disc receives and records information.

24. The disc recited in claim 23, wherein said protective film is made from a polycarbonate.

25. An optical disc, comprising:
    a disc substrate having a pitted surface and a reading surface opposite that of the pitted surface;

a reflection film formed on the pitted surface of the disc substrate;

a first protection film formed on said reflection film;

a second protection film having good transmissivity and high hardness, formed on the read surface of said disc substrate; and a third protection film, having a low surface energy, formed on said second protection film.

26. The disc recited in claim 25, wherein said second protective film is formed using a fluor material coating.

27. An optical disc, comprising:

a substrate having a recording surface and a reading surface opposite to the recording surface;

a reflective film formed on the recording surface;

a first protective film formed on said reading surface and having a good transmissivity and a high hardness, and a second protective film formed on said first protective film at a surface opposite to that of said substrate, wherein said second protective film has a low surface energy.

28. The optical disc as claimed in claim 27, further comprising a third protective film formed on said reflective film.

29. The optical disc as claimed in claim 27, further comprising:

a third protective film formed on said reflective film;

an adhesive layer formed on said third protective film;

a fourth protective film formed on said adhesive layer at a surface opposite to that of said third protective film;

a second reflective film formed on said fourth protective film;

a second substrate having a second recording surface formed adjacent to said second reflective film and a second reading surface opposite to the second recording surface;

a fifth protective film formed on said second reading surface and having the good transmissivity and the high hardness; and a sixth protective film formed on said fifth protective film at a surface opposite to that of said second substrate, wherein said second protective film has the low surface energy.

30. The optical disc as claimed in claim 27, further comprising:

a second substrate having a first surface formed on said reflective film and a second recording surface opposite to the first surface;

a second reflective film formed on said second recording surface; and a third protective film formed on said second recording surface.

31. The optical disc as claimed in claim 27, wherein:

said first protective film has a thickness of a few tens of microns; and said second protective film has a thickness of a few microns.

32. The optical disc as claimed in claim 31, wherein:

said first protective film is formed by one of a diamond coating, a diamond like coating (DLC) coating, an $SiO_2$ material coating and a flour-magnesium coating; and said second protective film is formed by a flour coating.

33. An optical disc, comprising:a substrate having a recording surface and a reading surface opposite to the recording surface;

a reflective film formed on the recording surface; and a first protective film formed on said reading surface and having a good transmissivity and a high hardness, wherein said first protective film further has a low surface energy and is made of a ratio of a fluor-magnesium combination and fluorine.

* * * * *

UNITED STATES PATENT AND TRADEMARK OFFICE
CERTIFICATE OF CORRECTION

PATENT NO.:    6,051,298
DATED     :    April 18, 2000
INVENTOR(S):   Jung-Wan KO, et al.

It is certified that [an/error[s]] appears in the above-identified patent and that said Letters Patent is hereby corrected as shown below:

Column 7,    Line 62, change "fluormagnesium" to -- fluor-magnesium--

Line 44, change "fluormagnesium" to -- fluor-magnesium--

Signed and Sealed this

Twentieth Day of March, 2001

Attest:

NICHOLAS P. GODICI

*Attesting Officer*    Acting Director of the United States Patent and Trademark Office